March 27, 1956 D. B. KILPATRICK 2,739,836
UNLOADING DEVICE
Filed Dec. 30, 1952 2 Sheets-Sheet 1

Inventor
DONALD B. KILPATRICK
By W. Irwin Haskett
Attorney

March 27, 1956     D. B. KILPATRICK     2,739,836
UNLOADING DEVICE
Filed Dec. 30, 1952     2 Sheets-Sheet 2
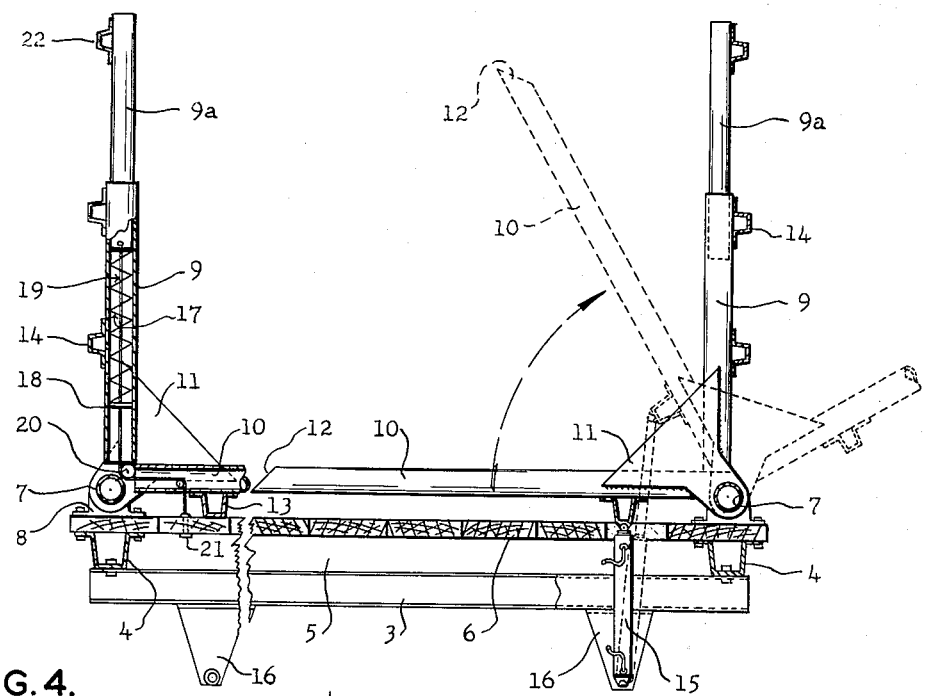
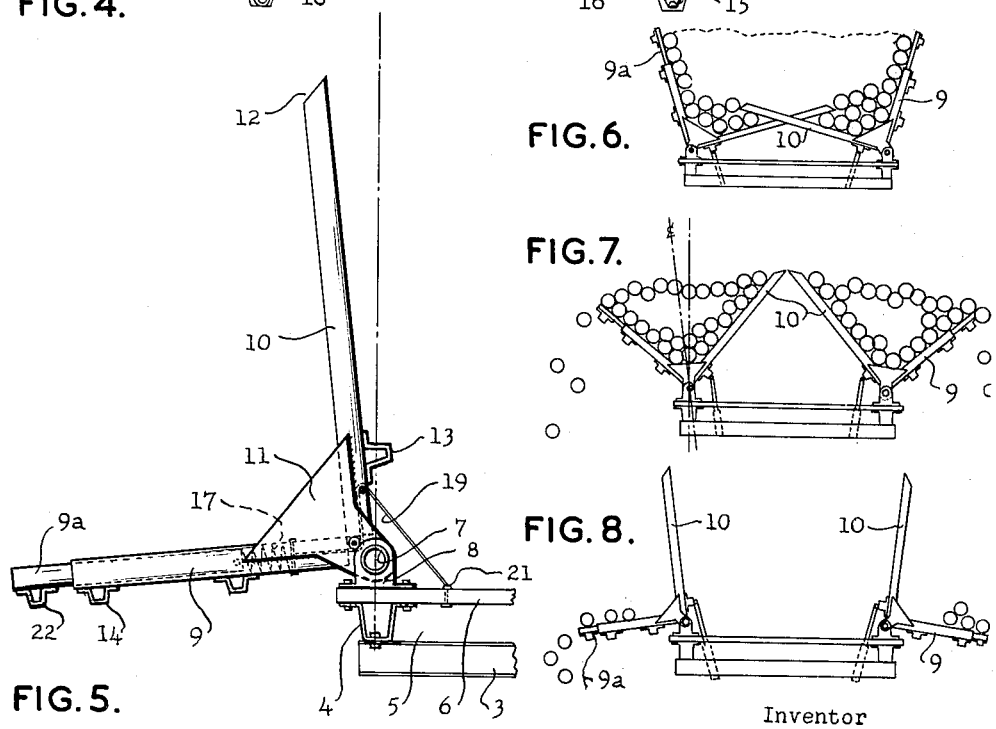
Inventor
DONALD B. KILPATRICK
By *W Irwin Haskett*
Attorney United States Patent Office 2,739,836
Patented Mar. 27, 1956

2,739,836

UNLOADING DEVICE

Donald B. Kilpatrick, Gorham, N. H.

Application December 30, 1952, Serial No. 328,644

17 Claims. (Cl. 298—18)

This invention relates to improvements in an unloading device and appertains particularly to a mechanical unloader for a motor vehicle, railroad flatcar or the like designed to support and retain material in transit and then unload it at its desination.

An object of the invention is to provide an unloading device suitable for rigid, elongated material of the general dimensions and shape of logs, that may be quickly dumped, complete unloading being possible whilst the vehicle is in motion, thereby reducing the unloading costs and turn-around time of the conveyance; and increasing the carrying capacity of the vehicle per working day.

A further object of the invention is to provide an unloading device that initially serves as the retainer for the material while in transit and then with a minimum of wear and tear on the vehicle divides and dumps one-half of the load to each side thereof at the destination.

A further object of the invention is to provide a load retaining and dumping structure for a vehicle, siutable for use with material such as logs and the like consisting of vertically hinging L-shaped assemblies on opposite sides of the vehicle in normally confronting relation, wherein the vertical or post parts of the L-shaped assemblies retract on dumping.

A still further object of the invention is the provision of a vehicle unloader for logs and the like adaptable for installation on a conventional truck chassis or railroad flatcar that is characterized by structural simplicity, durability and operating efficiency and that being capable of manufacture and assembly from standard structural shapes and available mechanical parts, at reasonable cost, is thereby rendered commercially desirable.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

In the drawings:

Figure 4 is an enlarged rear elevational detail of the unloader, with parts of the retractible post shown in section;

Figure 5 is a further rear elevational detail of one side of the unloader in fully dumped position; and Figures 6, 7 and 8 are schematic rear elevations of the unloader in successive unloading operating positions progressing from "just started," through "load-divided" to "fully dumped."

Figure 1:
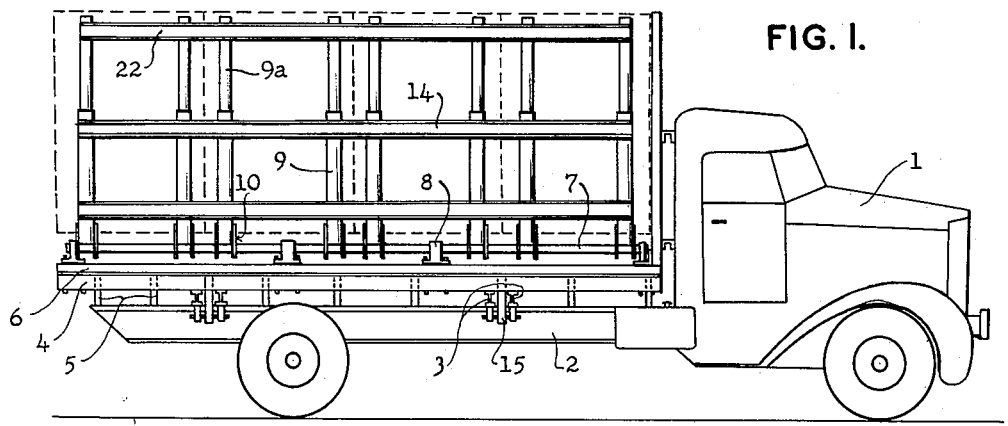
Figure 1 is a side elevation of one preferred embodiment of the invention installed on a standard motor vehicle truck.

The materials handling device herein described is designed to support and retain in transit and to unload mechanically from standard motor truck, railroad flatcar or other applicable vehicle, any elongated rigid material such as logs, posts, railroad ties, pipes and the like of dimensions and shape lending itself to the advantageous use of this structure.

The essential elements of the device are two L-shaped units that may be formed in a variety of ways but consist of rigid members arranged at relative right angles and are mounted at their vertices on two separate axes of rotation. These axes are suitably mounted on the frame or chassis of the vehicle adjacent and parallel to the sides thereof with the L-shaped units arranged in confronting relation with their horizontal arms available to carry the load and their vertical arms serving as load-confronting side posts.

The distance between adjacent horizontal arms or adjacent posts is determined by the length of material to be handled, the chief requirement being adequate support of the material during transit, with sufficient overhang outside the points of support to prevent the material from slipping through during the unloading cycle.

In the instant form of the invention shown in the drawings, the truck is designed for a composite load consisting of four separate sections of 4-foot cord wood and each section or segment of the load is handled by a longitudinally spaced pair of right angles or dumping arms on each axis. These opposing pairs are longitudinally staggered or so spaced with respect to one another that the pair on one axis rotates just outside or inside the pair on the other axis. When the device is at rest in the loaded condition, the horizontal arms of the right angles overlap their opposites on the floor of the vehicle, the amount of overlap required being governed by the depth of the load and the width of the vehicle.

To unload the vehicle the confronting L-shaped units are rotated slowly and symmetrically to the outside about their respective axes, through an arc of at least 90 degrees or as much as required to dump the load. The action is essentially slow, smooth and controlled and may be achieved by any suitable hydraulic or mechanical means, the power requirements thereof being supplied by the prime mover of the transporting vehicle or by an auxiliary installed for the purpose.

Under the combined influence of the upward thrust so provided, the rotation of the supporting right angles and the action of gravity, the load gradually shifts towards the outside and collapses vertically. The originally horizontal arms sweeping upward through the load reach a point where their free inner ends or extremities form a straight longitudinal ridge, dividing the load into two identical troughs or V's which are somewhat inclined to the outside, i. e., their bisectors have passed beyond the vertical.

Up to this point the overlap feature in these arms prevents any material from spilling to the floor of the vehicle. The geometry of the device is so arranged that when rotation has reduced the overlap to zero and opposite arms are about to separate, the topmost layer of material has been compelled to fall to one or other of the two available troughs or V's. Complete mechanical removal of the entire load is thus obtained.

The right angles or dumping arms continue to rotate outwards until the originally horizontal arms have described an arc in excess of 90 degress, spilling their contents in a balanced and symmetrical manner to both sides and into conveyors or other such facilities which may be provided.

To advance the initial spilling of material from the load, accelerate the unloading and ensure complete discharge of the load, the vertical arms or posts are designed to shorten automatically during the unloading cycle. I prefer to form these posts in two telescopically related parts and to have their overall length shortened automatically as the unloading units are rotated outwardly.

Unloading having been completed, the hydraulic or mechanical action is reversed to return the device to its position of rest.

Considered in a broad sense then the invention contemplates a superstructure or attachment for a vehicle in the nature of a load confining and discharging device that serves to transport the load as a single unit and subsequently to divide it into two substantially equal parts during its unloading operation and to deposit one such part on each side of the vehicle's path. The essential concept is that of a pair of confronting L-shaped structures rotatably mounted at their vertices on opposite longitudinal sides of the vehicle with the horizontal arms of the L-shaped structures serving as load carrying beams and the vertical arms as load-confining side posts, with power actuated means for oppositely rotating such L-shaped structures so that they swing upwardly and outwardly through substantially 90 degrees or more. What I mean by an L-shaped structure rotatably mounted at its apex is at least two arms lying at approximately right angles to one another and connected in some manner at least adjacent the apex and pivotally mounted in the area of the apex. Thus, instead of a vertical and a horizontal arm lying at right angles, in a common vertical plane and both connected to a tube or some such element that serves as a rotatable shaft, or instead of a single pipe or other form bent in a right angle and connected to a sleeve or shaft, I may provide a tube or shaft with spaced arms radiating therefrom at right angles to one another but spaced selectively therealong since it is not necessary that the arms meet at a common point on the shaft. Alternatively, the L-shaped structure may be defined as one that in end elevation appears as an L or in which the relatively horizontal and vertical arms form a substantial right angle.

Referring now particularly to the drawings, the reference character 1 designates a conventional truck with the usual rearwardly extending spaced pair of main frame channels 2 on which I have mounted transverse I-beams 3 in spaced pairs that in turn support at their opposite ends the subframe longitudinal channels 4. Also resting on edge on the main frame channels 2 are transverse wooden beams 5 that rise to the level of the subframe channels 4 and with said channels carry a plank flooring 6. This is substantially a basic truck platform differing but slightly from a type now used extensively. I prefer to use such a platform in my present log truck since it provides a supporting floor for the workman in the event the truck is being hand loaded. It is obvious, however, that the floor plays no part in carrying or dumping the load and may be dispensed with if desired.

Surmounting the planked platform 6, or alternatively on the longitudinal subframe channels 4 if the platform be omitted, I mount my novel unloading device. Along each longitudinal side of the platform, near the edge I provide a shaft 7, here seen as a tubular member, and rotatably support it in spaced bearing blocks 8. Vertical posts 9 rise at spaced intervals from each shaft and from the base of each post a horizontal beam 10 extends more than half way across the truck platform. A triangular plate 11 is welded to each side of the post and beam and has an apertured tail at its apex that embraces and is welded to the shaft 7 thereby forming a rigid unit of the assembled posts and beams with the side shaft. It will be noted on referring to Figure 2 that the horizontal beams 10 extending in from opposite sides of the vehicle must be offset longitudinally of the truck so that their inner ends that lie in overlapped relation in the horizontal plane do not interfere. Additionally, for dividing the load during the discharging operation, it has been found best to round or taper the free inner ends of the beams 10, as seen at 12. All the beams 10 attached to one shaft 7 are reinforced and held in alignment by a longitudinal stringer 13 in the form of a flanged channel welded on the lower side of the beams at a point just beyond the reach of the bevelled free ends of the beams from the opposite shaft. Similarly the posts 9 on each side have rigidifying horizontal rails 14 of similar channel form welded to their outer sides.

Figure 2:
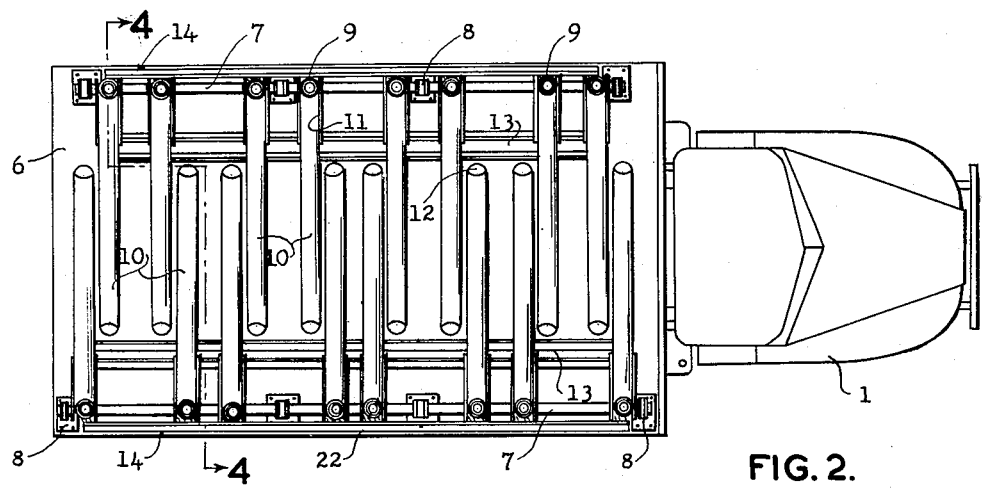
Figures 2 and 3 are a plan view and rear elevation thereof respectively.
Figure 3:
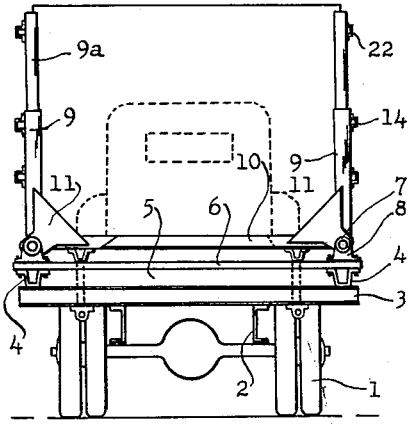

Viewed from the end, as the device is seen in all but Figures 1 and 2, the L-shaped form of the oppositely located and confronting assemblies that confine and retain the load is clearly noted. To discharge the load the L-shaped assemblies are simultaneously rotated in opposite directions about shafts 7, to swing said assemblies upwardly and outwardly, first acting to divide the load into parallel longitudinally extending V-shaped troughs of logs and finally dumping them all off the sides.

To rotate the shafts 7 or to cause the confronting L-shaped assemblies to swing outwardly, a chain and sprocket or a suitable cam or other mechanical device actuated by the truck motor may be used but for simplicity of illustration I have shown a conventional two-way pneumatic jack 15, two being used on each side, suspended between a pair of brackets 16 slung beneath the I-beams 3 and thrusting upwards against the longitudinal stringers 13 that connect and rigidify the beams of the L-shaped units. The outward thrust of the logs near the top lightens the initial burden on the rotating mechanism and the opposite halves of the load increasingly establish a balance of weight on the beams and posts as the rotation continues until at the time of completion of the separation of the load into two halves and the inner ends of the beams of opposite L-shaped assemblies clear past each other, the posts are carrying the greater part of the weight of the load. This novel unloading technique, in dividing a load and discharging half to each side simultaneously, maintains the balanced spread of stresses on the vehicle and avoids the distortion and impact common to end or one-side dumping.

Furthermore I have found that the unloading operation is improved considerably by shortening the posts as the units swing outward—the spilling begins sooner and the discharge is more rapidly completed. A simple way of effecting this post retraction is to form the post 9 in two telescopic sections by providing an outer end part 9a of lesser diameter and slidingly inserting it in the upper end of the main or base tubular post part. The smaller diameter extension 9a is normally urged outwards by a coil spring 17 in the lower post part 9 compressed between the bottom of the extension 9a and some fixed element in the post such as the transverse pin 18. The automatic retraction of the post extension in response to the outward rotation of the unloading unit may be produced in any desired fashion, a suitable cable connection being used in the present embodiment and consisting of a flexible cable 19 attached to the base or inner end of the extension 9a and descending through the coil spring to the base of the post 9 and passing around a pulley 20 supported between the spaced side plates 11 and running inwards through the horizontal beam 10 a short distance then emerging through a perforation in the underside thereof and anchoring by a bolt 21 to the platform 6 or other suitably fixed part of the truck frame or chassis. In a multiple load type of installation as shown, the retractile mechanism may be provided only in the end posts and dispensed with in the intermediate ones by uniting all the post extensions 9a along one side of the truck by a top rail 22 similar to the rail 14, so that the reciprocating action of the cable and spring actuated end post extensions is communicated to all the intermediately disposed post extensions. Thus as the L-shaped units rotate outwardly, the entire upper part of the truck's side walls retract, their overall height or length at any point in the unloading cycle varying directly with the degree of rotation achieved.

From the foregoing description taken in connection with the accompanying drawings, it will be manifest that an unloading device is provided that will fulfill all the necessary requirements of such a device. Since, however, many changes could be made in the above description and many apparently widely different embodiments of the invention could be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what I claim as new is:

1. A load-retaining and unloading device for a vehicle designed to carry a load of logs, log-like material or other objects of comparable size and shape comprising a pair of oppositely disposed L-shaped assemblies horizontally pivoted at their vertices along opposite sides of the vehicle, said L-shaped assemblies each consisting of at least a pair of longitudinally spaced normally vertical posts and horizontal beams, said posts having retractible extensions at their upper ends, means for rotating said assemblies outwardly to dump the load and means connected to said post extensions and anchored to said vehicle operable on the outward rotation of said L-shaped assemblies to retract said extensions.

2. A load-retaining and unloading device for a vehicle for operating with a unitary load of logs, log-like material or similar shaped objects of substantial dimensions comprising a pair of L-shaped assemblies horizontally pivoted at their vertices along opposite sides of the vehicle, said L-shaped assemblies each consisting of normally vertical posts and horizontal beams, with the said beams of opposite assemblies extending toward each other, said posts having slidable extensions at their upper ends, springs normally urging said extensions upwardly, means for rotating said L-shaped assemblies outwardly to dump the load and connections between said post extensions and said vehicle, operable on the outward rotation of said L-shaped assemblies to act against said springs and retract said extensions.

3. Load retaining and dumping structure for a vehicle for operating with a load of logs, log-like material or similar shaped objects of substantial dimensions comprising a pair of L-shaped members rotatably mounted at their respective vertices on opposite longitudinal sides of the vehicle, each of said L-shaped members consisting of at least two longitudinally spaced upright posts and two horizontal beams, the horizontal beams of opposite L-shaped members being overlapped at their inner ends, and means for oppositely rotating said L-shaped members.

4. Load retaining and dumping structure for a vehicle for operating with a load of logs, log-like material or similar shaped objects of substantial dimensions comprising a pair of L-shaped members each consisting of longitudinally spaced upright posts and longitudinally spaced horizontal beams and rotatably mounted approximately at its apex one on each side of the vehicle; said L-shaped members being disposed in inturned confronting relation with the inner ends of the horizontal beams of one overlapping those of the opposite one and means for oppositely rotating said L-shaped members through at least 90 degrees.

5. Load retaining and dumping structure for a vehicle designed to transport a unitary load of logs, log-like material or similar shaped objects of substantial dimensions comprising a pair of L-shaped members rotatably mounted at their respective vertices on opposite longitudinal sides of the vehicle, each of said L-shaped members consisting of at least two longitudinally spaced upright posts and two horizontal beams, the horizontal beams of opposite L-shaped members being offset longitudinally with respect to the vehicle and overlapped at their inner ends, and means for oppositely rotating said L-shaped members.

6. Load retaining and dumping structure for a vehicle designed to transport a load of logs, log-like material or other objects of similar shape and dimensions comprising a pair of L-shaped assemblies rotatably mounted at their vertices on opposite longitudinal edges of the vehicle, wherein each assembly consists of at least two longitudinally spaced L-shaped members and one arm of each L-shaped member serves as a vertical post and the other arm as a horizontal beam and wherein corresponding L-shaped members on opposite sides of the vehicle are longitudinally offset and have their horizontal arms overlapped in the horizontal plane, and means for rotating said L-shaped members in opposite directions to divide and dump the load.

7. A load-retaining and unloading device for a vehicle designed to transport logs, log-like material or other objects of comparable shape and dimensions comprising a pair of L-shaped assemblies horizontally pivoted at their respective vertices along opposite sides of the vehicle, said L-shaped assemblies each consisting of vertical posts spaced longitudinally of the vehicle and inwardly extending horizontal beams spaced longitudinally of the vehicle, such beams extending more than half way across the vehicle so that the inner ends of the beams of one L-shaped assembly overlap the inner ends of the beams of the L-shaped assembly on the opposite side of the vehicle, said beams having a declining upper surface on their overlapped inner ends; and means for rotating said partially overlapped L-shaped assemblies outwardly to first divide the load and then dump one half the load on each side of the vehicle.

8. The combination with the structure set forth in claim 7 of a longitudinally extending stringer secured to the underside of the beams of each respective assembly near the vertex thereof to rigidify and align such beams and the posts of each assembly have at least one horizontal rail secured thereto.

9. The combination with the structure set forth in claim 7 of a longitudinally extending stringer secured to the underside of the beams of each respective assembly near the vertex thereof and wherein said assembly-rotating means is mounted on the vehicle and operates against the underside of said stringers.

10. The combination with the structure set forth in claim 7 of a longitudinally extending stringer secured to the underside of the beams of each respective assembly near the vertex thereof and wherein said assembly-rotating means consists of pneumatic jacks disposed between the vehicle and said stringer and exerting an upward thrust against the latter.

11. The combination with the structure set forth in claim 7, of members extending from the upper ends of said posts, a longitudinally extending horizontal rail secured to said posts, a second rail secured to said extension members and paralleling said first rail, and means for retracting said post extension members and their connecting rail on the outward load-dumping rotation of said L-shaped assemblies.

12. The combination with the structure set forth in claim 7, of members extending from the upper ends of said posts, a longitudinally extending horizontal rail secured to said posts, a second rail secured to said extension members and paralleling said first rail, and means connecting the extension members in the end posts to the vehicle for automatically retracting said end post extension members on the outward load-dumping rotation of said L-shaped assemblies, which automatic retraction is connected to the extensions of any intermediate posts through their common connection to said second rail.

13. An unloading device for a vehicle designed to transport a unitary load of logs, log-like material or similar shaped objects of substantial dimension and operable even while the vehicle is in motion comprising a pair of L-shaped assemblies rotatably mounted one on each side of the vehicle and each having inwardly extending normally horizontal arms that overlap with those of the opposite L-shaped assembly to provide a common floor for the unitary load and means for simultaneously rotating said L-shaped assemblies outwardly to divide and dump the load.

14. An unloading device for a vehicle designed to transport a unitary load of logs, log-like material or similar shaped objects of substantial dimension comprising a pair of transversely spaced L-shaped assemblies rotatably mounted one on each side of said vehicle and each consisting of at least two longitudinally spaced normally vertical and horizontal arms respectively; the longitudinally spaced horizontal arms of opposite L-shaped assemblies normally lying in overlapped relation and serving as a common floor for the unitary load and means for rotating said L-shaped assemblies outwardly to divide and dump the load.

15. An unloading device for a vehicle designed to transport a unitary load of logs, log-like material or similar shaped objects of substantial dimension comprising two pairs of longitudinally spaced L-shaped members arranged parallel to one another and rotatably mounted on opposite sides of the vehicle and arranged with one set of arms of one pair disposed horizontally and in overlapping relation with those of the other pair and serving as the common floor for the unitary load and the other set of arms of each pair of L-shaped members serving as posts to confine opposite sides of the unitary load, and means for simultaneously rotating said opposite pairs of L-shaped members outwardly to divide the unitary load and dump one half thereof to each side of the vehicle.

16. A load-retaining and unloading device for a vehicle designed to transport a unitary load of logs, log-like material or similar shaped objects of substantial dimension and operable while the vehicle is in motion comprising a pair of L-shaped assemblies horizontally pivoted at their vertices along opposite sides of the vehicle and each consisting of at least two longitudinally spaced normally horizontal arms and two longitudinally spaced normally vertical arms with the normally horizontal arms of opposite L-shaped assemblies normally lying in overlapped relation and serving as a common floor for the unitary load and means for simultaneously rotating said assemblies outwardly to initially divide the unitary load and then dump one-half of the load to each side of the vehicle even as it continues in motion.

17. A load-retaining and dumping structure for a vehicle designed to carry a unitary load of short-length light-weight pulp wood logs or the like and to divide and dump the load while the vehicle is in motion comprising a pair of L-shaped members horizontally pivoted at their respective vertices along opposite sides of the vehicle, said L-shaped members each consisting of a longitudinally disposed shaft of tubular form with pairs of tubes spaced therealong, each pair of tubes consisting of a post and a beam radiating from said shaft at substantially right angles to one another and a plate member disposed laterally against each side of each such pair of tubes and having a perforated extension embracing said shaft and secured to said post and beam and shaft in a rigid assembly, the beams from opposite L-shaped members extending toward each other and normally lying in horizontal, longitudinally offset relation and serving as a floor for the unitary load and the posts of opposite L-shaped members serving as the opposite side walls, retaining the load, and means for oppositely rotating said L-shaped members simultaneously to divide the unitary load and dump one-half thereof to each side of the vehicle.

References Cited in the file of this patent

UNITED STATES PATENTS 2,161,734    Wheless _____ June 6, 1939